United States Patent
Prakash et al.

(10) Patent No.: US 9,628,172 B2
(45) Date of Patent: Apr. 18, 2017

(54) OPTIMIZATION OF PHOTONIC SERVICES WITH COLORLESS AND DIRECTIONLESS ARCHITECTURE

(71) Applicants: Anurag Prakash, Noida (IN); Mohit Chhillar, Pitam Pura (IN); Gerard Leo Swinkels, Ottawa (CA)

(72) Inventors: Anurag Prakash, Noida (IN); Mohit Chhillar, Pitam Pura (IN); Gerard Leo Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 170 days.

(21) Appl. No.: 14/554,145

(22) Filed: Nov. 26, 2014

(65) Prior Publication Data
US 2015/0117850 A1  Apr. 30, 2015

(30) Foreign Application Priority Data
Oct. 13, 2014  (IN) .......................... 2924/DEL/2014

(51) Int. Cl.
*H04B 10/032* (2013.01)
*H04J 14/02* (2006.01)

(52) U.S. Cl.
CPC ........ *H04B 10/032* (2013.01); *H04J 14/0291* (2013.01); *H04J 14/0295* (2013.01)

(58) Field of Classification Search
CPC ........................... H04B 10/032; H04J 14/0241
See application file for complete search history.

(56) References Cited

U.S. PATENT DOCUMENTS

| | | | |
|---|---|---|---|
| 7,417,950 B2 | 8/2008 | Hofmeister et al. | |
| 7,835,267 B2 | 11/2010 | Zamfir et al. | |
| 8,402,121 B2 | 3/2013 | Skalecki et al. | |
| 8,509,618 B2 | 8/2013 | Boertjes et al. | |
| 8,666,247 B2 | 3/2014 | Srinivasan et al. | |
| 8,682,160 B2 | 3/2014 | Prakash et al. | |
| 8,718,471 B2 | 5/2014 | Prakash et al. | |
| 8,750,706 B2 | 6/2014 | Boertjes et al. | |
| 2003/0169470 A1* | 9/2003 | Alagar ................ | H04J 14/0227 398/5 |
| 2007/0189663 A1* | 8/2007 | Hirai .................. | H04Q 11/0005 385/24 |
| 2011/0222862 A1 | 9/2011 | Boertjes et al. | |
| 2012/0027408 A1 | 2/2012 | Atlas et al. | |
| 2012/0163814 A1* | 6/2012 | Zhao .................. | H04J 14/0257 398/49 |

(Continued)

FOREIGN PATENT DOCUMENTS

WO    2013127472 A1    9/2013

*Primary Examiner* — Nathan Curs
(74) *Attorney, Agent, or Firm* — Clements Bernard Walker PLLC; Christopher L. Bernard; Lawrence A. Baratta, Jr.

(57) ABSTRACT

A method, in a node operating in a network with a control plane, to optimize wavelength retuning on service redials, includes detecting a failure on a link associated with the node; and, for each affected connections on the link, sending a respective release message to an associated originating node via the control plane, the release message including a protect path and a wavelength, wherein the release message is utilized by the associated originating node to redial the affected connections with the protect path and the wavelength determined by the node, to minimize wavelength retuning on the affected connections.

18 Claims, 12 Drawing Sheets

(56) References Cited

U.S. PATENT DOCUMENTS

| | | |
|---|---|---|
| 2012/0183294 A1 | 7/2012 | Boertjes et al. |
| 2012/0201541 A1* | 8/2012 | Patel ............... H04J 14/0212 398/58 |
| 2013/0064073 A1* | 3/2013 | Cheng ............... H04L 45/24 370/225 |
| 2013/0177305 A1 | 7/2013 | Prakash et al. |
| 2013/0308948 A1 | 11/2013 | Swinkels et al. |
| 2014/0126899 A1 | 5/2014 | Prakash et al. |
| 2014/0147107 A1 | 5/2014 | Swinkels et al. |
| 2014/0205278 A1 | 7/2014 | Kakkar et al. |
| 2015/0215032 A1* | 7/2015 | Bevilacqua ......... H04J 14/0267 398/5 |
| 2015/0244494 A1* | 8/2015 | Grobe ............... H04J 14/0278 398/68 |
| 2016/0105380 A1* | 4/2016 | Chhillar ............ H04L 49/557 370/244 |

* cited by examiner

OPTIMIZATION OF PHOTONIC SERVICES WITH COLORLESS AND DIRECTIONLESS ARCHITECTURE

CROSS-REFERENCE TO RELATED APPLICATION(S)

The present patent application/patent claims the benefit of priority of Indian Patent Application No. 2924/DEL/2014, filed on Oct. 13, 2014, and entitled "OPTIMIZATION OF PHOTONIC SERVICES WITH COLORLESS AND DIRECTIONLESS ARCHITECTURE," the contents of which are incorporated in full by reference herein.

FIELD OF THE DISCLOSURE

The present disclosure relates generally to networking systems and methods. More particularly, the present disclosure relates to systems and methods for optimization of photonic services with a Colorless and Directionless (CD) architecture.

BACKGROUND OF THE DISCLOSURE

In a Colorless and Directionless (CD) architecture with a control plane-enabled network, services are determined by the path and the wavelength that the services occupy, limited by wavelength continuity. On a service redial, through the control plane, a path, a wavelength, or both needs to be modified. For a wavelength change, a retune function can attribute additional time (e.g. 30 s or more) in systems which is undesirable for mesh restoration and other time critical activities. It would be advantageous to minimize the number of retunes in redials. Also, for a set of service, the retune function can cause a "retune domino effect" on all the services in the set if not done judiciously. Further, in a distributed control plane, the wavelength retune can cause a service to get into a non-converging "Retune Loop" for cases of wavelength contention. Thus, in conventional CD architectures in control plane networks, there is a need for optimization with respect to retunes to avoid the domino effect, to ensure services come up without loops, and minimizing time due to crankbacks for convergence to the appropriate wavelength.

BRIEF SUMMARY OF THE DISCLOSURE

In an exemplary embodiment, a method, in a node operating in a network with a control plane, to optimize wavelength retuning on service redials, includes detecting a failure on a link associated with the node; and for each affected connections on the link, sending a respective release message to an associated originating node via the control plane, the release message including a protect path and a wavelength, wherein the release message is utilized by the associated originating node to redial the affected connections with the protect path and the wavelength determined by the node, to minimize wavelength retuning on the affected connections. The method can further include adding each new connection associated with the node to a queue with source-destination pairs for the new connection; determining in order, a protect path using an existing wavelength for all connections in the queue and if unable to find a protect path for a connection, moving the connection to an end of the queue; and, if unable to find a protect path using the existing wavelength for one or more of the connections after traversing the queue, determining a protect path for the one or more of the connections which require a retune with a new wavelength.

The protect path for all the connections in the queue with the existing wavelength can be cached for additional iterations with the one or more of the connections requiring the retune. To minimize the wavelength retuning, the node can be configured to determine the protect path using an existing wavelength for all affected connections first, and only for the affected connections that do not have a protect path with the existing wavelength, the node is configured to determine the protect path with different wavelength. The different wavelength can be determined based on a cyclic algorithm. The different wavelength can be determined based on a recursive tree algorithm. The node can have a Colorless/Directionless architecture at Layer 0. The control plane can be a source-based routing control plane and the associated originating nodes using the protect path and the wavelength in the release message to redial the affected connections.

In another exemplary embodiment, a method, in a node operating in a network with a control plane, to plan protect paths to minimize wavelength retuning on service redials, includes adding each new connection associated with the node to a queue with source-destination pairs for the new connection; determining a protect path for all connections in the queue in order using an existing wavelength for each of the connections and, if unable to find a protect path, moving the connection to an end of the queue; if unable to find a protect path for one or more of the connections with an associated existing wavelength after traversing the queue, determining a protect path for the one or more of the connections which require a retune with a new wavelength; and storing the protect paths for the connections, for use in respective release messages for affected connections responsive to a failure, the release messages including the protect path and a wavelength determined by the node, to minimize wavelength retuning on the connections. The protect path for all the connections in the queue with the existing wavelength can be cached for additional iterations with the one or more of the connections requiring the retune. The new wavelength can be determined based on a cyclic algorithm. The determining can be performed as a background task in the node avoiding impact to runtime performance. The new wavelength can be determined based on a recursive tree algorithm.

The method can further include detecting the failure; and sending a respective release message for all the affected connections, via the control plane, with the protect path and wavelength to an associated originating node for each of the connections. To minimize the wavelength retuning, the node can be configured to determine the protect path using an existing wavelength for all the connections first, and only for the connections that do not have a protect path with the existing wavelength, the node is configured to determine the protect path with different wavelength. The node can have a Colorless/Directionless architecture at Layer 0. The control plane is a source-based routing control plane with the associated originating nodes using the protect path and the wavelength in the release message to redial the connections.

In a further exemplary embodiment, a node operating in a network with a control plane, the node is configured to plan protect paths to minimize wavelength retuning on service redials, includes one or more ports communicatively coupled to one or more links in the network; and a controller communicatively coupled to the one or more ports, wherein the controller is configured to detect a failure on a link associated with the node; and, for each affected connections on the link, send a respective release message to an associated originating node via the control plane, the release message including a protect path and a wavelength, wherein the release message is utilized by the associated originating node to redial the affected connections with the protect path and the wavelength determined by the node, to minimize wavelength retuning on the affected connections.

The controller can be further configured to add each new connection associated with the node to a queue with source-destination pairs for the new connection; determine in order, a protect path using an existing wavelength for all connections in the queue and if unable to find a protect path for a connection, moving the connection to an end of the queue; and, if unable to find a protect path using the existing wavelength for one or more of the connections after traversing the queue, determine a protect path for the one or more of the connections which require a retune with a new wavelength. To minimize the wavelength retuning, the controller can be configured to determine the protect path using an existing wavelength for all the affected connections first, and only for the affected connections that do not have a protect path with the existing wavelength, the controller is configured to determine the protect path with different wavelength.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods are described for optimization of photonic services with a Colorless and Directionless (CD) architecture. The systems and methods seek to retune only the services where retuning is required, through service correlation in the network and predetermination of the effect of individual fiber cuts in the network. In the CD architecture, the requirements are to not only get the most optimum path, but also a most optimum wavelength which minimizes disruptions for the other services.

Exemplary Control Plane Network

Figure 1:
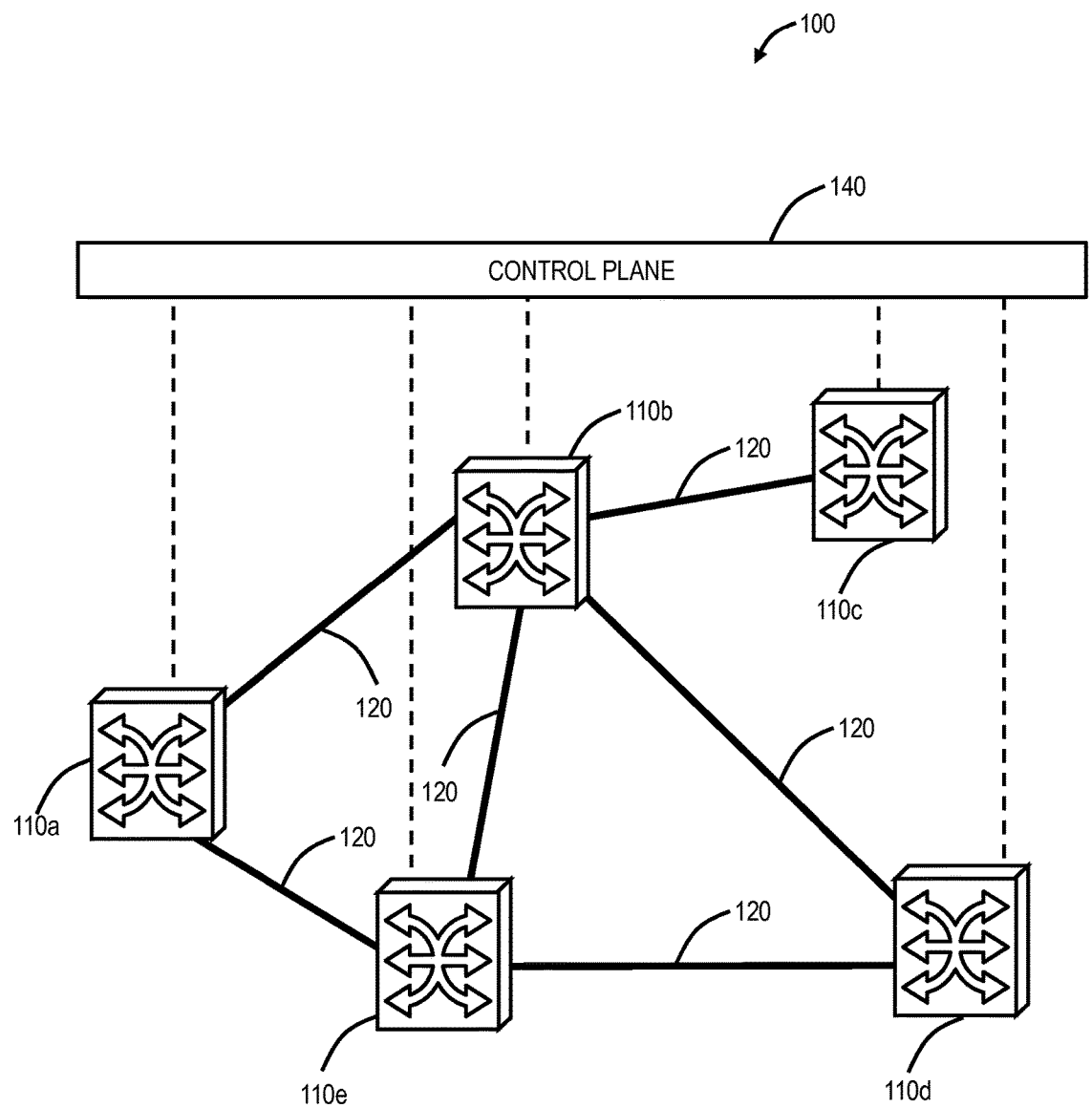
FIG. 1 is a network diagram illustrates an exemplary network with five interconnected nodes.
Figure 13:
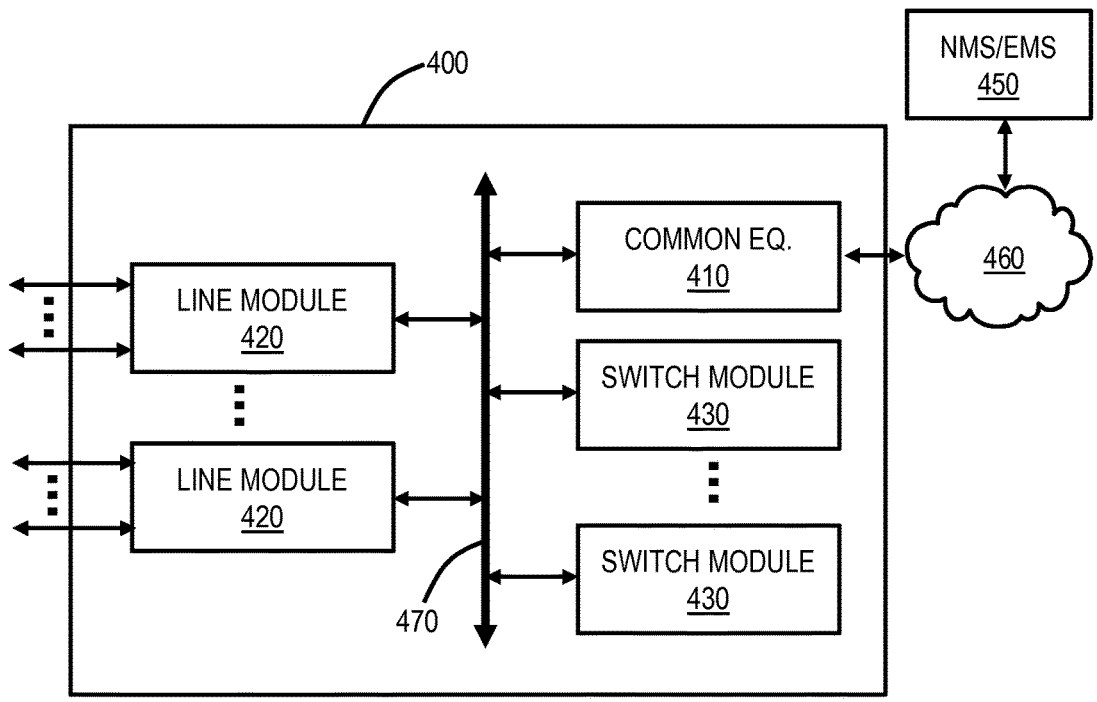
FIG. 13 is a block diagram illustrates an exemplary node for use with the systems and methods described herein.

Referring to FIG. 1, in an exemplary embodiment, a network diagram illustrates an exemplary network 100 with five interconnected nodes 110*a*, 110*b*, 110*c*, 110*d*, 110*e*. The nodes 110 are interconnected through a plurality of links 120. The nodes 110 communicate with one another over the links 120 through L0, L1, and/or L2. For example, the links 120 can be optical fibers with services at various wavelengths. The nodes 110 can be network elements which include a plurality of ingress and egress ports. An exemplary node 400 is illustrated in FIG. 13. The network 100 is illustrated, for example, as an interconnected mesh network, and those of ordinary skill in the art will recognize the network 100 can include other architectures, with additional nodes 110 or with less nodes 110, etc.

The network 100 can include a control plane 140 operating on and/or between the nodes 110*a*, 110*b*, 110*c*, 110*d*, 110*e*. The control plane 140 includes software, processes, algorithms, etc. that control configurable features of the OTN network 100, such as automating discovery of the nodes 110, capacity of the links 120, port availability on the nodes 110, connectivity between ports; dissemination of topology and bandwidth information between the nodes 110; calculation and creation of paths for connections; network level protection and restoration; and the like. Optical (i.e., transport) networks and the like (e.g., Wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control planes provide automatic allocation of network resources in an end-to-end manner. Exemplary control planes may include Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween.

In an exemplary embodiment, the control plane 140 can utilize ASON, GMPLS, OSRP, or the like. Those of ordinary skill in the art will recognize the network 100 and the control plane 140 can utilize any type of control plane for controlling the nodes 110 and establishing connections therebetween. In control plane networks, connections can include a Sub-Network connection (SNC) for ASON and OSRP or Label Switched Path (LSP) for GMPLS. Note, SNCs and ODU LSPs (or simply LSPs) can both be referred to as end-to-end paths or end-to-end signaled paths. The control plane 140 can include a Path Computation Element (PCE) or the like which is configured to compute paths through the network 100 based on constraints and weights.

Wavelength Assignment

Figure 2:
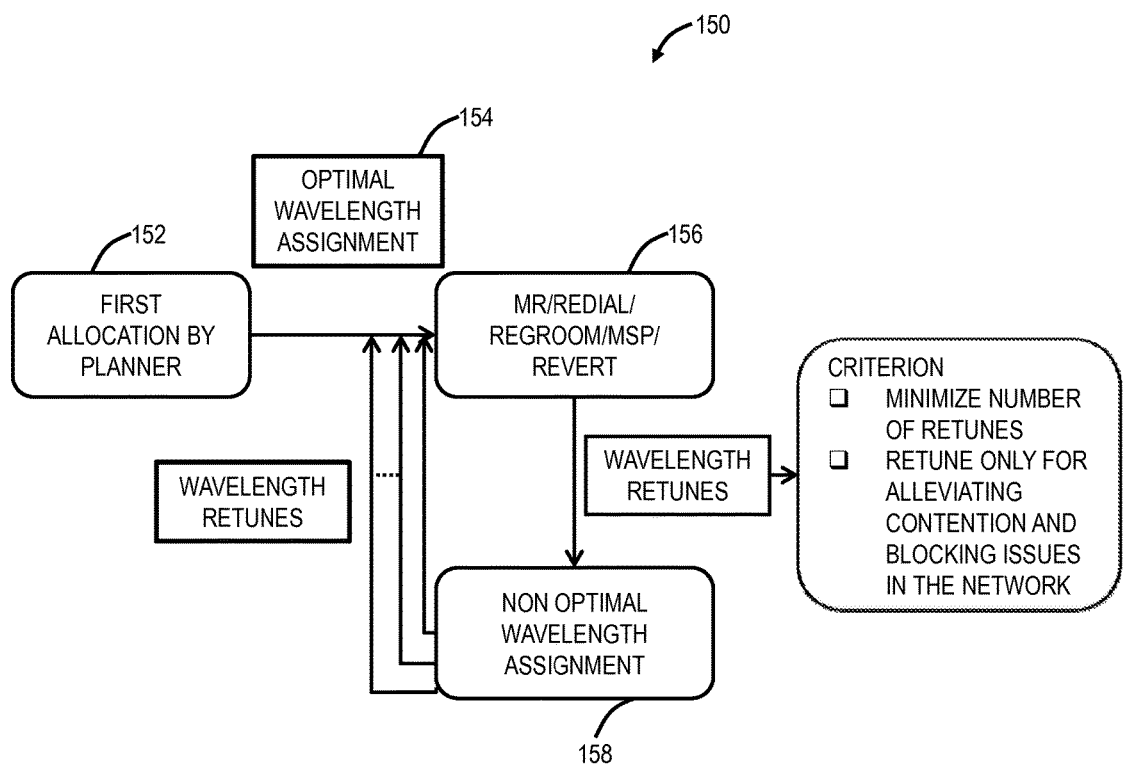
FIG. 2 is a state diagram of wavelength assignment in the network of FIG. 1.

Referring to FIG. 2, in an exemplary embodiment, a state diagram illustrates wavelength assignment 150 in the network 100. The network 100 includes a CDC architecture at Layer 0 where some or all of the services can retune to a different wavelength. Initially, the network 100 and the control plane 140 can utilize Routing and Wavelength Assignment (RWA) to optimally plan the services in the network, such as using a network planner tool or the like (state 152). The network 100 can include a plurality of calls established in the network, which are wavelengths providing connectivity between the nodes 110, and initially, the calls can utilize an optimal wavelength assignment 154 based on the state 152. Various operations in the network 100 can lead to wavelength retunes (state 156). For example, some of the operations can include Mesh Restoration (MR), redials, regrooms, Manual Switch to Protect (MSP), revert, and the like. The operations lead to non-optimal wavelength assignments (state 158). The objective of wavelength retunes is to minimize the overall number of retunes, and to retune only for alleviating contention and blocking issues in the network 100.

A wavelength retune is triggered during a redial/regroom/MSP/revert operation due to: i) Local Drop Contention (LDC), such as originating node Colorless Channel Mux/Demux (CCMD) wavelength contention; ii) RWA—network route wavelength blocking; iii) Nodal Constraints (NC)—network partial connectivity; vi) regenerator bank wavelength contention; and v) Remote Drop Contention (RDC), such as terminating node CCMD wavelength contention based on a crankback. For crankbacks for tail end connections, during connection re-route/restore, connections try for the current view in network and probably contend for the same resources, and crank-back and then retry. This happens since routing updates are much slower than signaling, and the same link resource and wavelength can be given to multiple connections (overbooked) at the time of (protect) path computation, in an event of mesh restoration. Also, in a distributed control plane, the PCE is unaware of the terminating node as well as regenerator bank contention unless this information is flooded; RDC/REGEN Cardinality=Direction Independent Access (DIA)×Degrees (DEG)×WAVELENGTHS×CCMD.

Wavelength Retuning Algorithms

Figure 3:
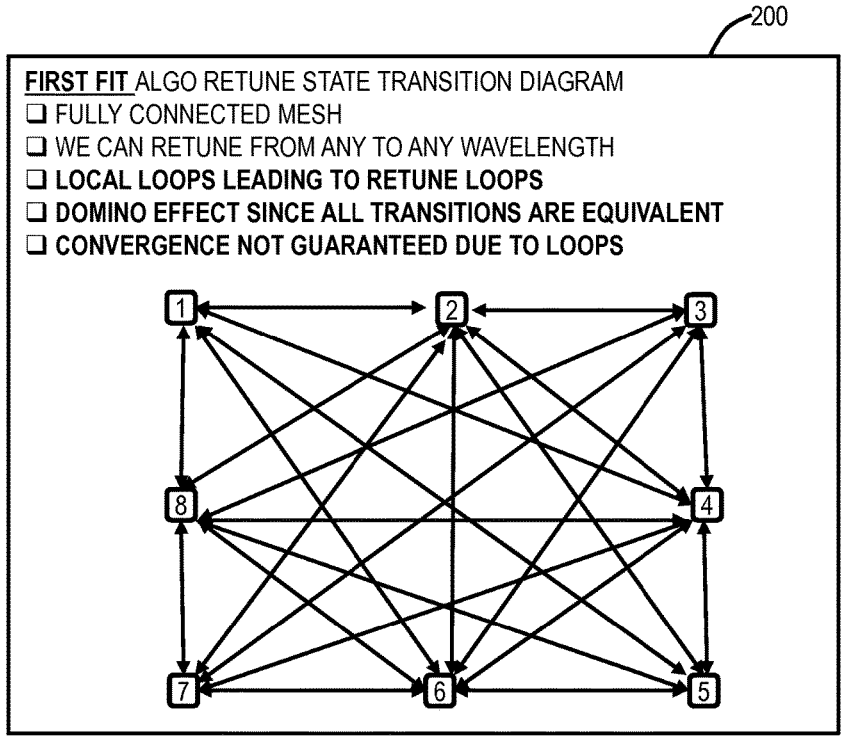
FIG. 3 is a diagram of a first fit algorithm wavelength retuning algorithm.
Figure 4:
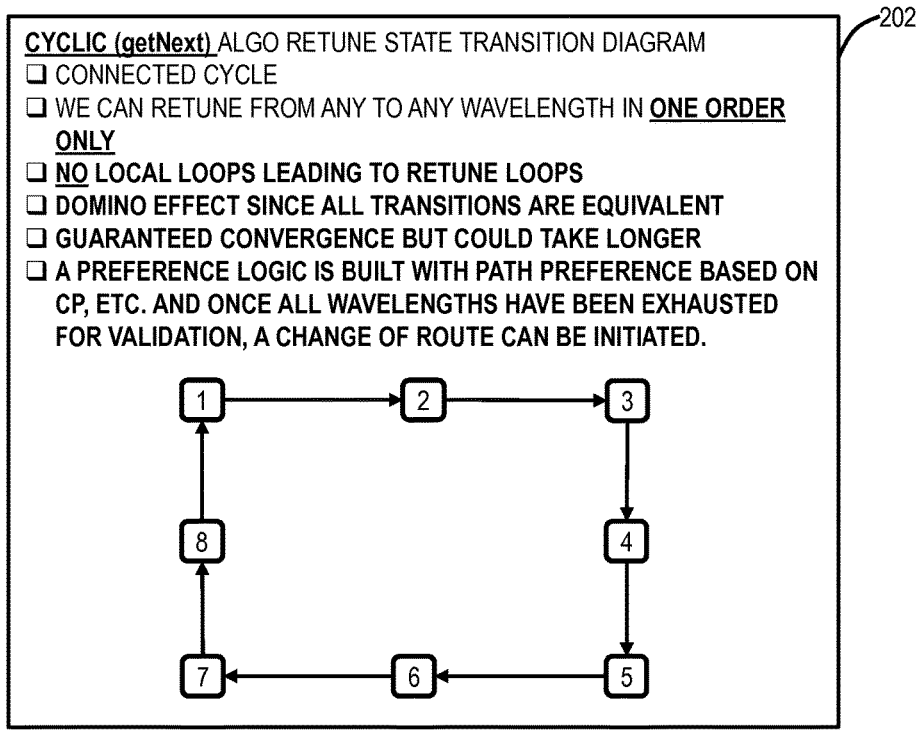
FIG. 4 is a diagram of a cyclic algorithm wavelength retuning algorithm.
Figure 5:
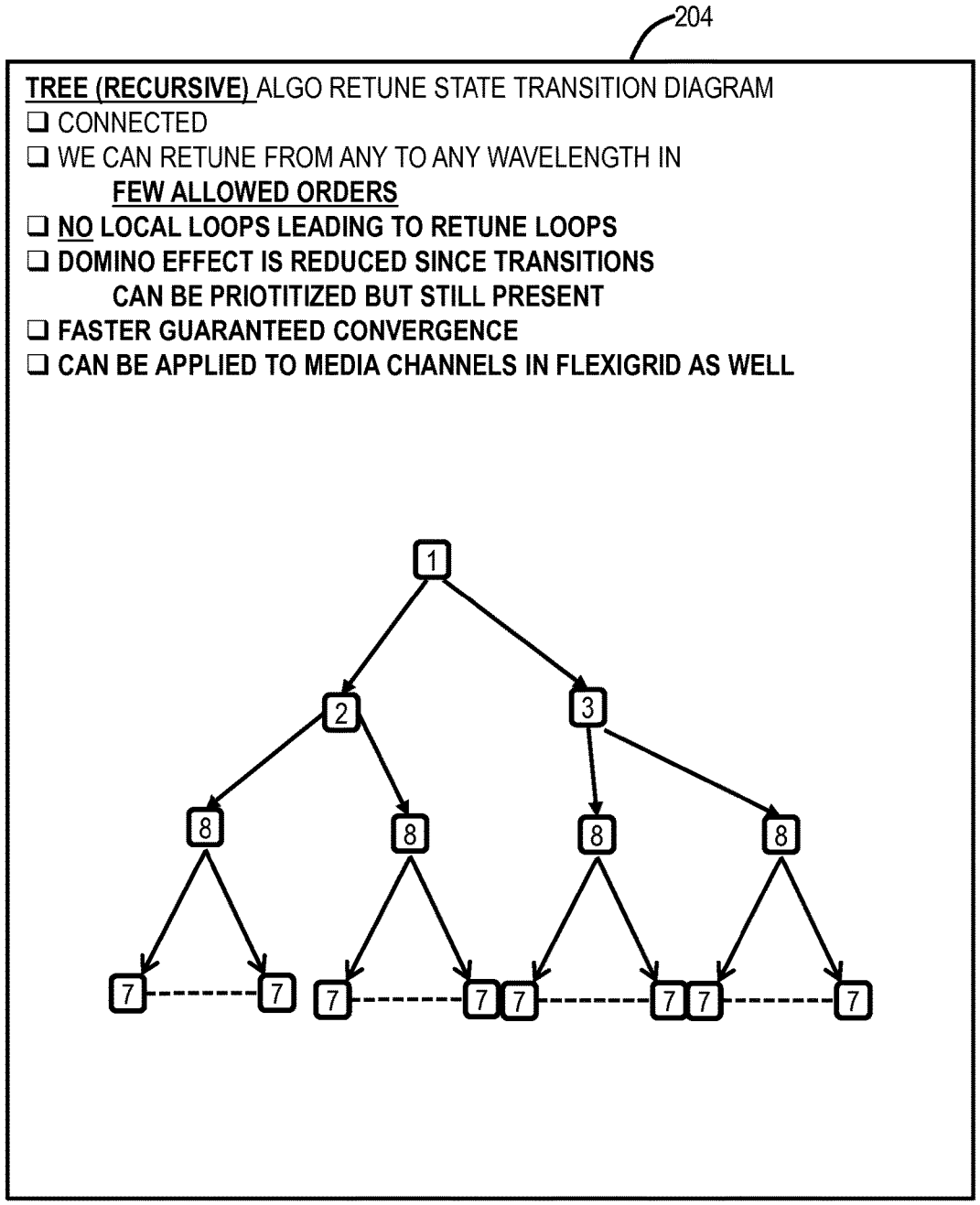
FIG. 5 is a diagram of a recursive tree algorithm wavelength retuning algorithm.

Referring to FIGS. 3, 4, and 5, in exemplary embodiments, various wavelength retuning algorithms are described. FIG. 3 illustrates a first fit algorithm 200, FIG. 4 illustrates a cyclic algorithm 202, and FIG. 5 illustrates a recursive tree algorithm 204. The first fit algorithm 200 selects a wavelength for retuning based on a first available wavelength. This results in a fully connected mesh, from the perspective of transitions. That is, a wavelength X can transition to any of N wavelengths. Unfortunately, with the first fit algorithm 200, local loops can lead to retune loops, there can be a domino effect since all transitions are equivalent, and convergence is not guaranteed due to loops.

The cyclic algorithm 202 includes retuning from any wavelength to any other wavelength in one order only. For example, a simple implementation of the cyclic algorithm 202 is for the wavelengths to move in an incremental fashion, i.e. next wavelength from wavelength Y is wavelength Y+1. The cyclic algorithm 202 does not have local loops, but there can be a domino effect since all transitions are equivalent. There is guaranteed convergence, but it could take longer. With the control plane 140 and the cyclic algorithm 202, once all wavelengths have been exhausted for validation, the control plane 140 can initiate a route change.

The recursive tree algorithm 204 includes retuning from any wavelength to any other wavelength is a few allowed order. For example, the recursive tree algorithm 204 can include wavelength M transitioning to wavelength M+1 or M+2, etc. The recursive tree algorithm 204 does not have local loops, but there can be a domino effect since all transitions are equivalent. The recursive tree algorithm 204 reduces the domino effect since transitions can be prioritized. Also, the recursive tress algorithm 204 provides faster, guaranteed convergence (from the cyclic algorithm) and it can be applied to media channels in a flexible grid.

Figure 6:
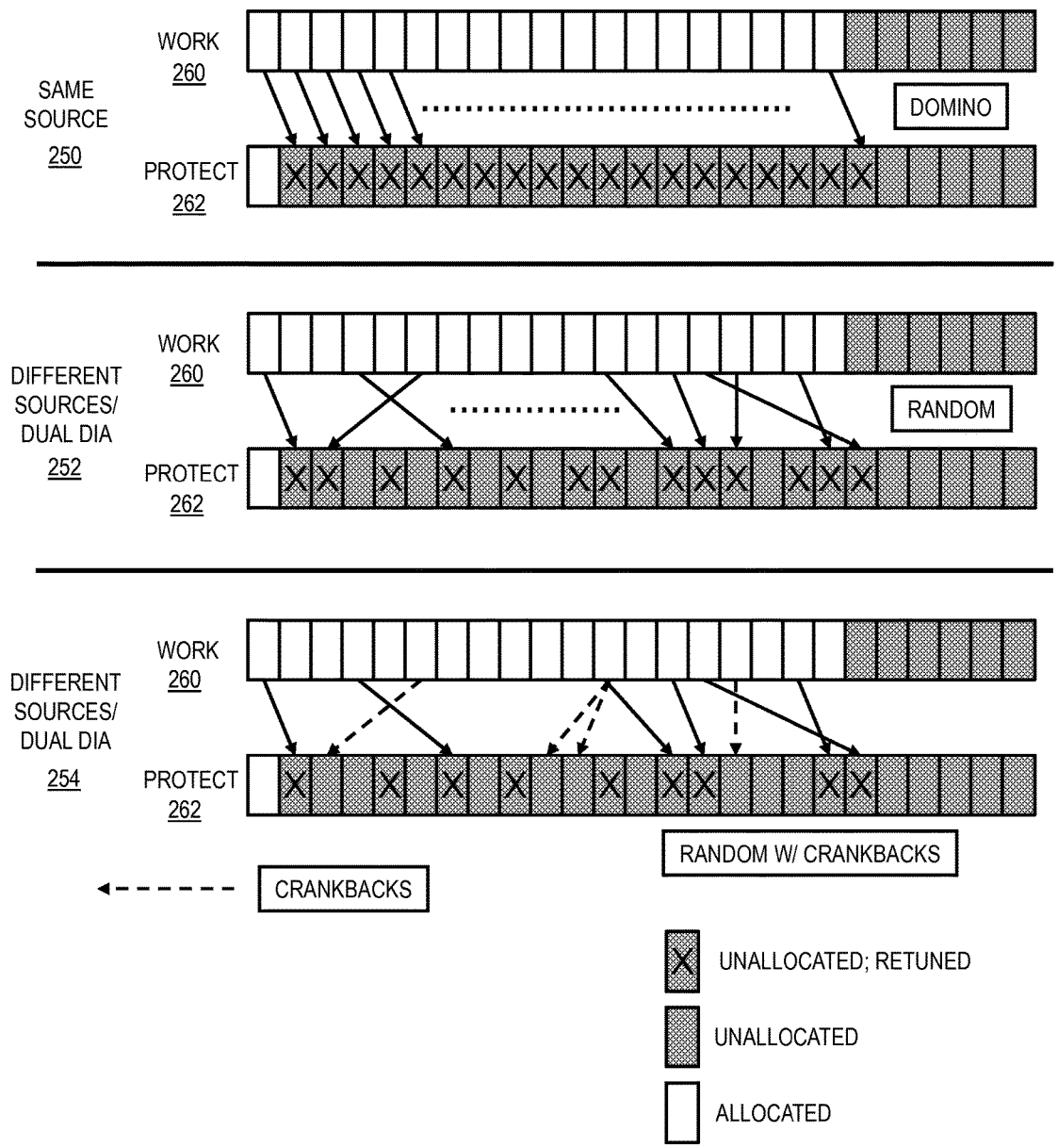
FIG. 6 is a block diagram of examples of wavelength retuning illustrating a retune domino effect.
Figure 7:
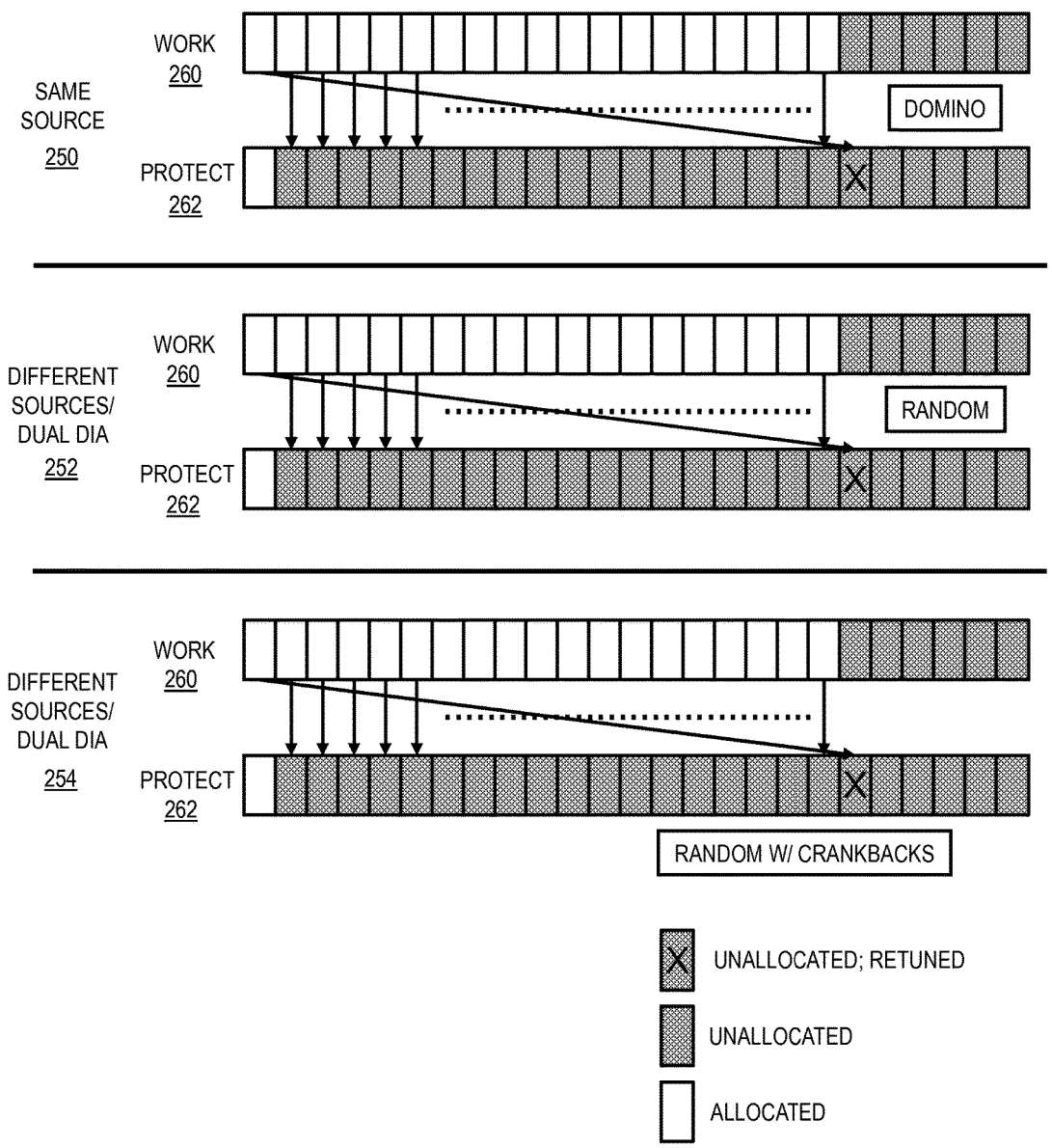
FIG. 7 is a block diagram of the examples of FIG. 6 illustrating an ideal scenario, achieved with the systems and methods described herein.

Referring to FIGS. 6 and 7, in exemplary embodiments, block diagrams illustrate examples of wavelength retuning for services having a same source 250, different sources 252 with dual DIA architectures and random timing, and different sources 254 with dual DIA architectures and random timing with crankbacks. FIG. 6 illustrates the retune domino effect whereas FIG. 7 illustrates an ideal scenario, achieved with the systems and methods described herein. These examples can be through the network 100, or any other network, and illustrate wavelength occupancy for one of the links 120 in the network. The examples illustrate work wavelengths 260 and protect wavelengths 262 with the work wavelengths 260 illustrating where wavelengths are currently, and the protect wavelengths 262 illustrating where the wavelengths are being moved. Note, ideally, the work wavelengths 260 would be moved to a same wavelength of the protect wavelengths 262, but due to contention issues as described herein, this is often not possible. In all of the examples, the protect wavelengths 262 are unallocated except for the first wavelength.

Figure 8:
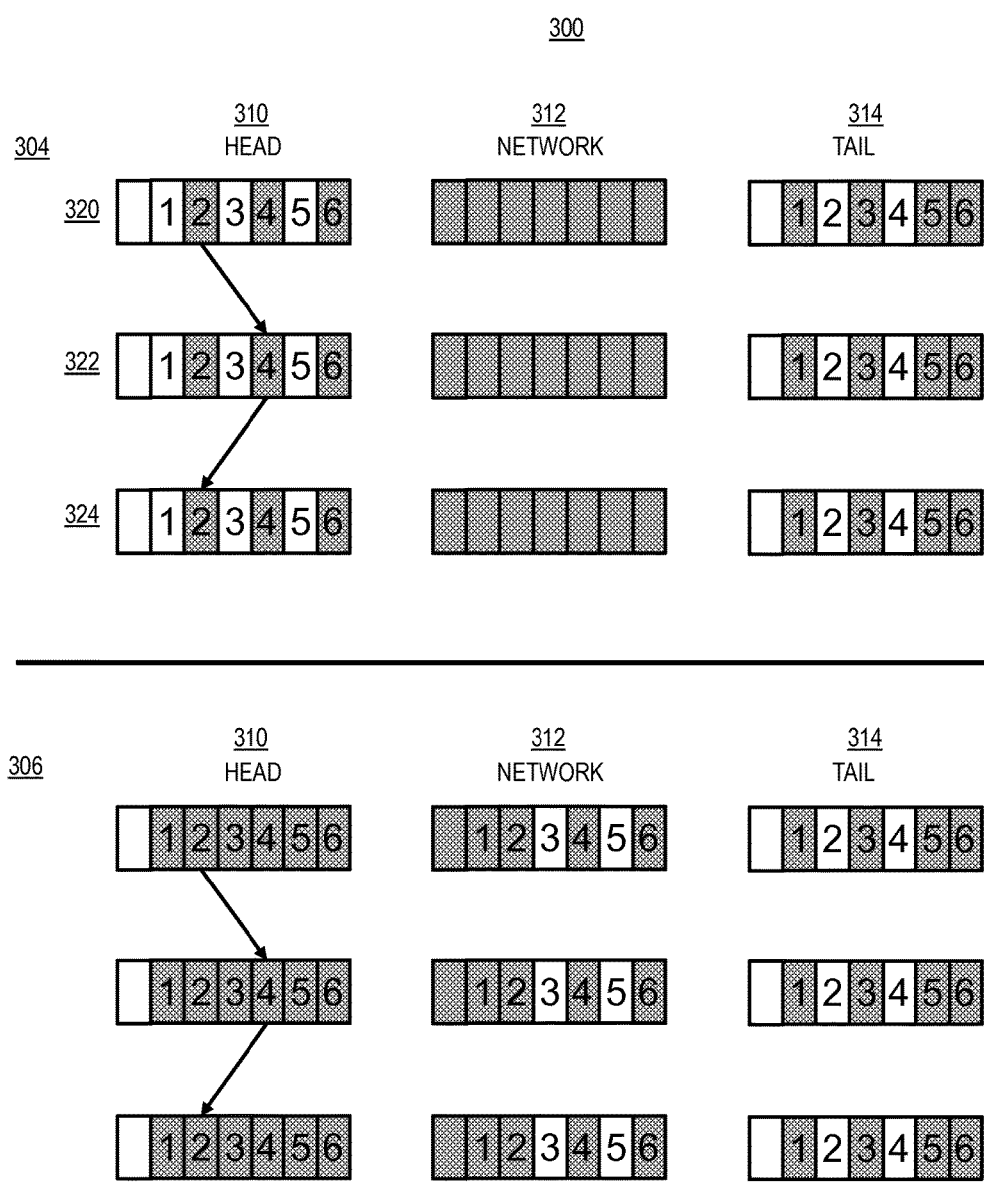
FIG. 8 is a block diagram of a wavelength retuning with a first fit retuning.

The same source 250 illustrates the case where all of the work wavelengths 260 originate at a same source node 110. The different sources 252, 254 illustrate the case where the work wavelengths 260 originate at different source nodes 110, leading to timing differences in the redial/retune. Note, the examples could use any of the aforementioned retuning algorithms. In FIG. 7, for the same source, retuning the first wavelength of the work wavelengths 260 requires a retune, and it retunes to the second wavelength of the protect wavelengths 262. This leads to a domino effect where all of the work wavelengths 260 have to retune by one wavelength to the protect wavelengths; thus every work wavelength 260 experiences a retune. For the different sources 252, the switch from the work wavelengths 260 to the protect wavelength 262 is random, leading to a vast majority of the work wavelengths 260 having to retune. For the different sources 254, the switch from the work wavelengths 260 to the protect wavelength 262 is random, but uses crankbacks, leading to about half of the work wavelengths 260 having to retune to the protect wavelengths 262. In FIG. 8, for the ideal scenario, it is shown that only the first wavelength of the work wavelengths 260 retunes, in all of the cases.

Figure 9:
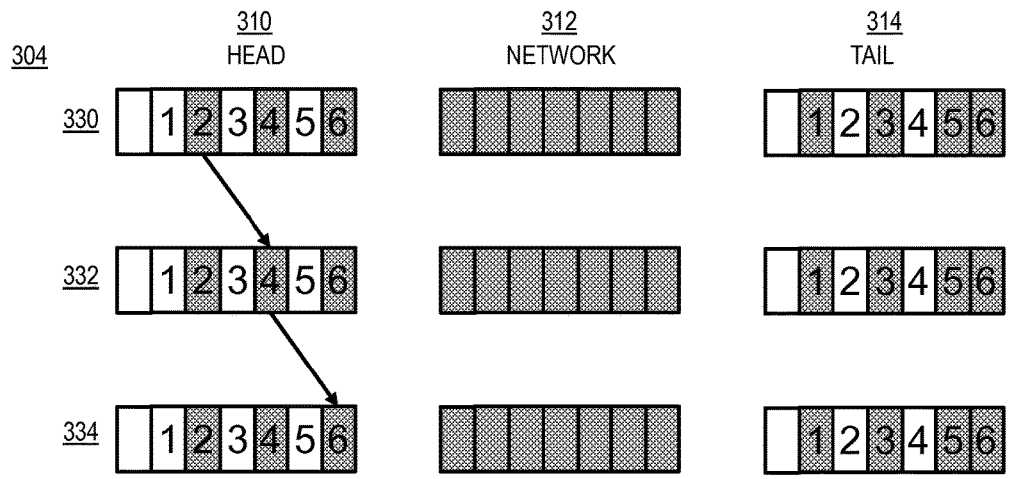
FIG. 9 is a block diagram of a wavelength retuning with a cyclic tuning.
Figure 9:
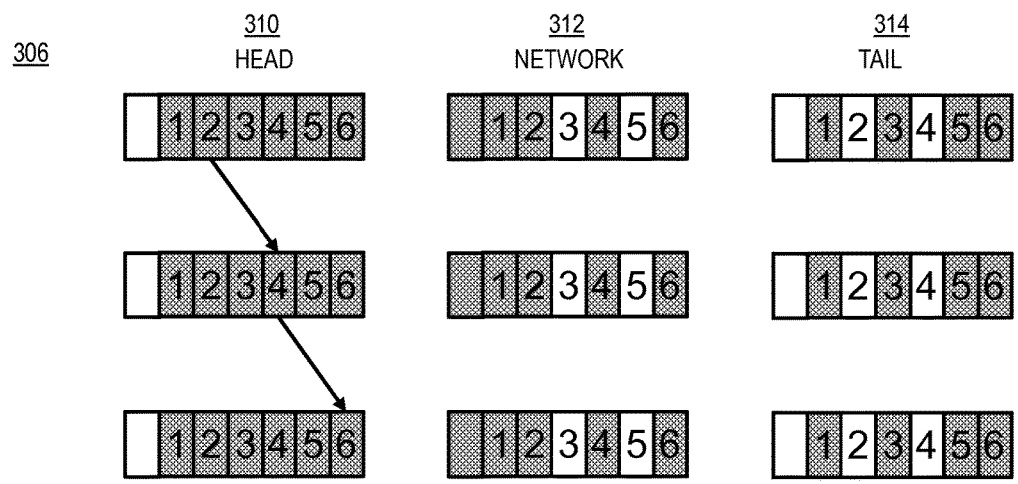

Referring to FIGS. 8 and 9, in exemplary embodiments, block diagrams illustrate examples of wavelength retuning with a first fit retuning 300 (FIG. 8) and a cyclic retuning 302 (FIG. 9). Each of the retuning 300, 302 examples includes two scenarios 304, 306 with different wavelength fills at a head node 310, in a network 312, and at a tail node 314. Specifically, the scenario 304 illustrates LDC and RDC at the head node 310 and the tail node 314, respectively, whereas the scenario 306 illustrates network contention and RDC at the tail node 314. In FIG. 8, for the first fit retuning 300 in the scenario 304, at a point 320, the wavelength 2 at the head node 310 needs to switch and selects the wavelength 4. The wavelength 2 is available everywhere except at the tail node 314, and the head node 310 moves to the next available wavelength, the wavelength 4 at point 322. Again, the wavelength 4 is available everywhere except at the tail node 314, and the head node 310 moves to the next available wavelength, which is the wavelength 2 at a point 324, leading to a retune loop. In FIG. 8, for the first fit retuning 300 in the scenario 306, the same behavior is observed as in the scenario 304. Note, ideally, for the scenarios 304, 306, the wavelength should be the wavelength 6, but there is no convergence because of the loop.

In FIG. 9, for the cyclic retuning 302 in the scenario 304, at a point 330, the wavelength 2 at the head node 310 needs to switch and selects the wavelength 4. The wavelength 2 is available everywhere except at the tail node 314, and the head node 310 moves to the next available wavelength, based on the cyclic algorithm, the wavelength 4 at point 332. Again, the wavelength 4 is available everywhere except at the tail node 314, and the head node 310 moves to the next available wavelength, based on the cyclic algorithm, which is the wavelength 6 at a point 334, leading to convergence. In FIG. 9, for the cyclic retuning 302 in the scenario 306, the same behavior is observed as in the scenario 304.

Figure 10:
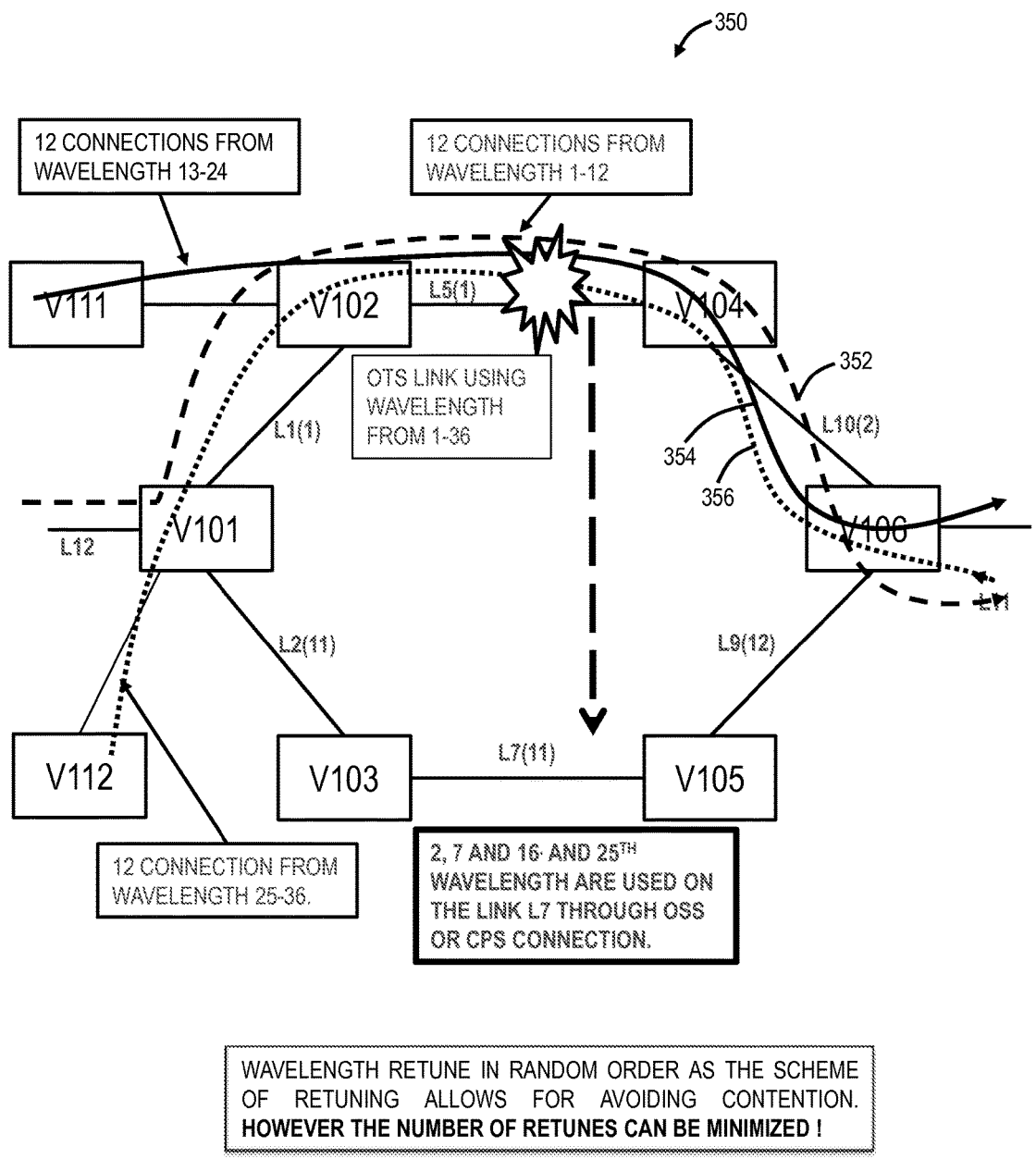
FIG. 10 is a network diagram of a network illustrating wavelength retuning.

Referring to FIG. 10, in an exemplary embodiment, a network diagram illustrates a network 350 illustrating wavelength retuning The network 350 includes nodes V101-V106, V111, V112 interconnected by links L1, L2, L5, L7, L9, L10, L1. The links shown with an administrative weight, e.g. the link L1 has a weight of 1, L1(1), the link L2 has a weight of L2(11). There are three connections 352, 354, 356 in the network 350, each with 12 wavelengths. The connection 352 is between the nodes V101, V102, V104, V106 on the wavelengths 1-12. The connection 354 is between the nodes V111, V102, V104, V106 on the wavelengths 13-24. The connection 356 is between the nodes V112, V101, V102, V104, V106 on the wavelengths 25-36. There is a fault on the link L5, affecting all of the connections 352, 354, 356, and requiring mesh restoration. All of the protect paths will require routing over the link L7, on which the wavelengths 2, 7, 16, and 25 are in use. Since the connections 352, 354, 356 have different source nodes, wavelength retuning in a random order allows for avoiding contention. However, the goal of the systems and methods is to minimize the number of wavelength retunes.

Note, the control plane 140 described herein utilizes source-based routing where each of the connections 352, 354, 356 is controlled and redialed by its associated source node. As per the source routing, the connections 352, 354, 356 which get the release to the originating node first tries to restore first and occupy the bandwidth. The governing factor is the latency of a RELEASE message to reach the originating node, and the time taken by the connections 352, 354, 356 to free the existing connections 352, 354, 356. The wavelength selection logic would look at the wavelengths free on the shortest path, and try to get the best out of them. Conventionally, it does not consider the wavelength requirements of other services (originating on same nodes or different) which will also be trying to setup. It is totally un-deterministic to the control the sequence of restoring connection with this source routed control plane or a pure Software Defined Networking (SDN)-controlled system.

Due to the above vagaries, there is no way one can correlate what other connections are restored in the network 350 due to a common point of failure in the network. This makes (protect) path computation to simply get the Shortest Path First (SPF). An existing service chooses the best available wavelength on the new path selected. This may or may not lead to a retune of the wavelength for the service.

Wavelength Retuning Optimization

In an exemplary embodiment, a wavelength parameter can be included as part of an Associated Hop Designated Transit List (DTL) or Explicit Route Object (ERO). This allows a user specified path and user specified wavelength in case of failure of a particular link, but this approach needs all the information to be manually determined by the user. The user has to verify that multiple Associated Hop DTLs or EROs for different connections do not conflict. The user verification on the Associated Hop DTLs or EROs could also be based on stale network topology.

In another exemplary embodiment, the connections can be ordered on all of the nodes in a same order, as specified by the specific retuning algorithm. This ordering guarantees the release of connections in synch with the retune algorithm; thus minimizing the number of retunes. This solution can be incomplete since there still could be some asynchronous behavior caused by differences in communication message latency on the various links.

Wavelength Retuning Optimization Process

Figure 11:
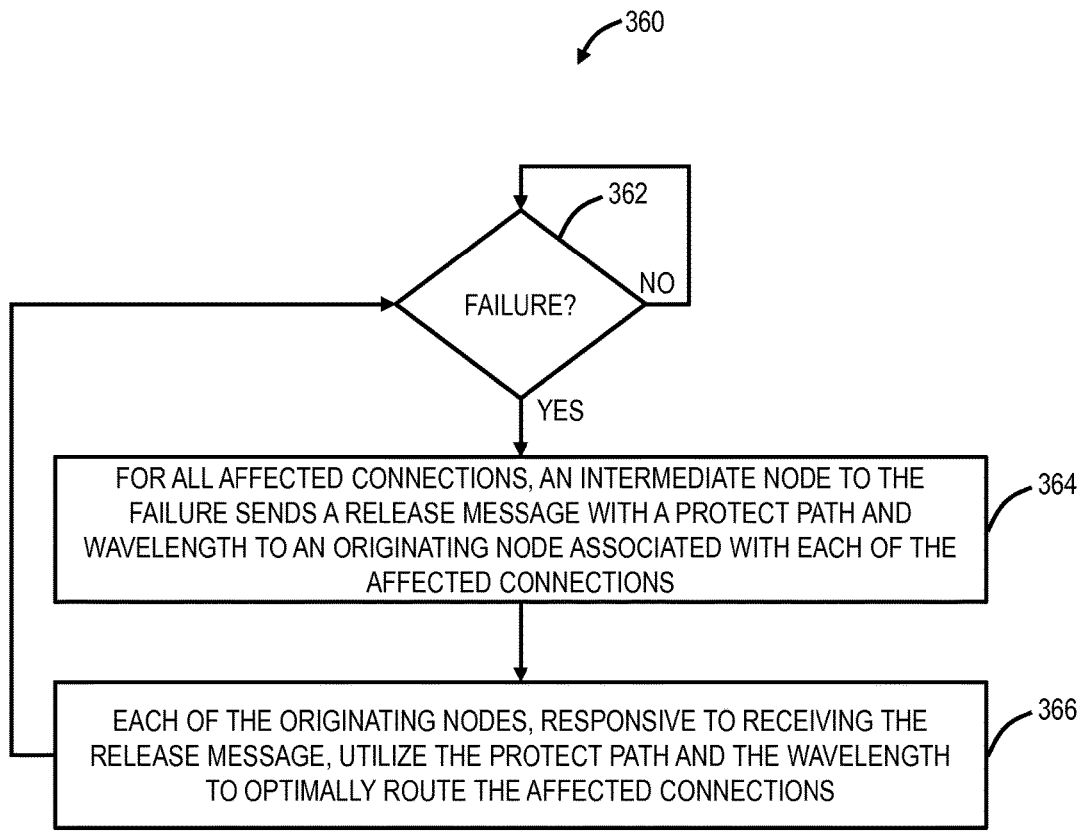
FIG. 11 is a flow chart of a wavelength retuning optimization process.

Referring to FIG. 11, in an exemplary embodiment, a flow chart illustrates a wavelength retuning optimization process 360. The wavelength retuning optimization process 380 relies on intermediate protect path computation for minimizing wavelength retuning. Since the control plane 140 utilizes source-based routing, the intermediate node can optimally compute the protect path and associated wavelength, and provide the computed protect path and the associated wavelength in a RELEASE message to the originating node. The intermediate node is in the best position to determine rerouting to minimize wavelength retuning since the intermediate node has a view of all of the connections that have to be rerouted, considering the connections have different originating nodes. The wavelength retuning optimization process 360 is implemented, in the network 100, 400, responsive to a failure, such as on one of the links 120 (step 362).

For all affected connections, an intermediate node to the failure sends a release message with a protect path and wavelength to an originating node associated with each of the affected connections (step 364). The intermediate node to the failure is in the best position to advise all of the originating nodes of the protect path and wavelength to minimize retuning. That is, conventionally, the various originating nodes work in parallel to determine protect routes and wavelengths. As described herein, this leads to sub optimal approaches with significant wavelength retuning With the wavelength retuning optimization process 360, the source-based routing is preserved, but the intermediate node advises all of the originating nodes with the protect path and wavelength, to achieve the optimal results in FIG. 7. This approach uses RELEASE signaling to "advise" the originating nodes with the protect path and wavelength to take for a particular connection in the event of Mesh Restoration. Note, if the intermediate node is also a source node for one or more of the affected connections, the intermediate node can still perform the restoration, but does not have to signal a RELEASE message to itself. Each of the originating nodes, responsive to receiving the release message, utilizes the protect path and the wavelength to optimally route the affected connections (step 366).

Figure 12:
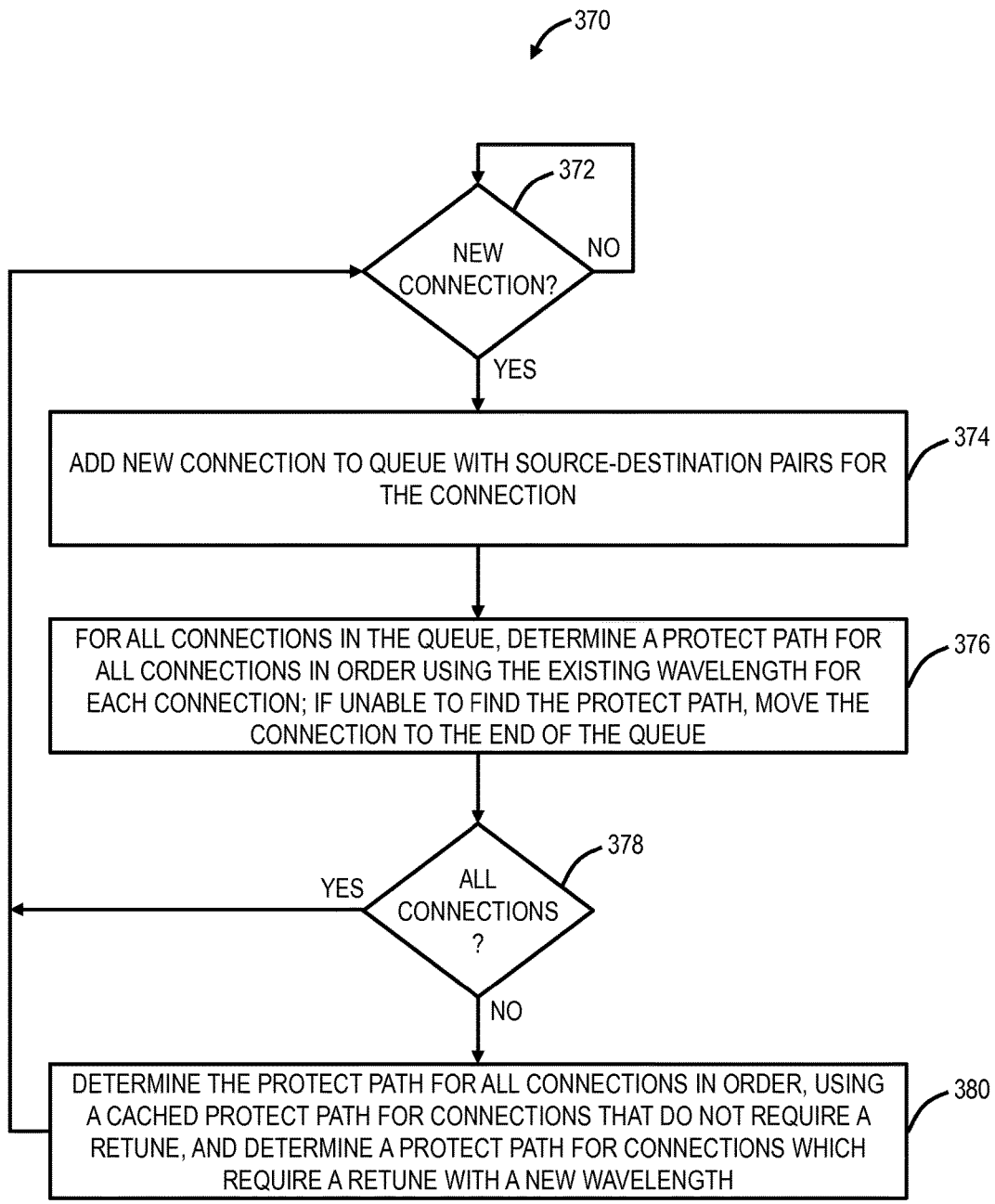
FIG. 12 is a flow chart of a protect path computation process for use with the wavelength retuning optimization process of FIG. 11.

Referring to FIG. 12, in an exemplary embodiment, a flow chart illustrates a protect path computation process 370, for use with the wavelength retuning optimization process 360.

The intermediate node can either compute the protect paths and wavelengths responsive to the failure or have precomputed paths. The protect path computation process 370 determines protect paths and wavelengths for all connections originating or traversing a node. The protect path computation process 370 can be implemented, periodically, when a new connection is received (step 372), etc., at one of the nodes.

For the protect path computation process 370, a node maintains a queue of all connections that originate or traverse the node. Upon receiving a new connection, the node adds the new connection to the queue with source-destination pairs for the connection (step 374). The node, for all connections in the queue, determines a protect path for all connections in order using the existing wavelength for each connection; if unable to find the protect path, the node moves the connection to the end of the queue (step 376). After all the connections in the queue have been processed, if all of the connections have protect paths with their existing wavelengths (step 378), the protect path computation process 370 returns to the step 372.

If there are connections that did not have a protect path with their existing wavelength (step 378), the protect path computation process 370 determines the protect path for all connections in order, using a cached protect path for connections that do not require a retune, and determining a protect path for connections which require a retune with a new wavelength (step 380). The protect path computation process 370 picks up every connection in the queue one by one and calculates the protect path with the existing wavelength. If it cannot find the wavelength, then the connection is moved to end of queue. So after one iteration through the queue, the protect path computation process 370 has the connections which require a retune. The bandwidth for other connections which do not require retuning are marked as used in the cache maintained in each iteration. Optionally, the protect path computation process 370 can be enabled per connection (e.g. SNC or LSP) or per link as part of a Shared Risk Connection Group (SRCG) algorithm.

Advantageously, the wavelength retuning optimization process 360 and the protect path computation process 370 provide priority to the connections which do not require a wavelength retuning to grab available resources in the network. Also, these provide optimized network bandwidth utilization and minimize the number of wavelength retunes in the network. Another advantage is the avoidance of crankbacks leading to faster restoration as the wavelengths that retune are optimally predetermined. The protect path computation process 370 can run periodically as a background task with impacts to runtime performance. The systems and method collect statistics (i.e. correlation data in a SRCG case) during the computation of protect paths for MR/redial. The systems and methods provide deterministic behavior for MR and allows for an optimized way to reduce the number of retunes for connections, while only adding path computation overhead in the background for protect paths on nodes distributed across the network.

During the protect path computation process 370, link cache bandwidth can be used for temporary bandwidth calculation adjustments for protect path computation. The lifespan of the cache is when all protect path computations have been achieved for a particular SRCG or link. This is never flooded. Every link can carry cache bandwidth data as follows: {Cache Identifier: Failed Link Node+Port/LINK IG ID; Cache Dirty Bit: Identifies if Cache is Active}.

For cache initialization, for every link in the current paths of all SRCG connections, the Link Cache (RAIG/Dirty Bit) are updated for double booking of bandwidth. For example, a Link (L1) in the current path of a connection C1, updates the cache as: {L1 Cache Raig: CacheDirtyBit=FALSE; Cache Available Wavelength=Bit Vector of the available wavelengths}. Then, the link can be added to the Global List of Cache Enabled Links: gl_LinkCache List.

The following pseudocode describes protect path computation. First, using the cache initialization,

```
- for (;pConnInSRCG; pConnInSRCG = pConnInSRCG->pNextConn)
    o UpdateLinkCacheForCurrentPath (pConnInSRCG->pWorkingPath)
Compute optimized protect paths for SRCG:
- for (;pConnInSRCG; pConnInSRCG = pConnInSRCG->pNextConn)
    o for  (Size = pBucketInSRCG->Size; pBucketInSRCG->Size && Size
        ;requestedConn++)
        ■ maxConnsNoRetune = ComputeDijkstraCacheEnabledNoRetune
            (requestedConn, *protectPath,...)
        ■ Size -= (maxConnsNoRetune);
        ■ SaveProtectPath (protectPath)
    o for (; pBucketInSRCG->Size && Size ; requestedConns++)
        ■ maxConnsRetune = ComputeDijkstraCacheEnabledWithRetune
            (requestedConns[...], *protectPath,...)
        ■ Size -= (maxConnsRetune);
        ■ SaveProtectPath (protectPath)
    o ResetGlobalLinkCache
```

A Modified Dijkstra algorithm can be used for Link Cache enabled Min-Max flow computation: ComputeDijkstraCacheEnabledMaxFlow Cache Use: If Link CacheDirtyBit is NOT set use Link Cache for calculation; else use actual RWA vector for calculation Max Flow: Update RWA vector per link and use the updated vector for further route computation.

Exemplary Network Element/Node

Referring to FIG. 13, in an exemplary embodiment, a block diagram illustrates an exemplary node 400 for use with the systems and methods described herein. In an exemplary embodiment, the exemplary node 400 can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM) platform, etc. into a single, high-capacity intelligent switching system providing Layer 0, 1, and/or 2 consolidation. In another exemplary embodiment, the node 400 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 400 can be any digital system with ingress and egress digital signals and switching therebetween of channels, timeslots, tributary units, etc. While the node 400 is generally shown as an optical network element, the systems and methods contemplated for use with any switching fabric, network element, or network based thereon.

In an exemplary embodiment, the node 400 includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460 (as well as a Path Computation Element (PCE), Software Defined Network (SDN) controller, OpenFlow controller, etc.). The management system 450 can include a network management system (NMS), element management system (EMS), or the like. Additionally, the common equipment 410 can include a control plane processor, such as a controller 500 illustrated in FIG. 14, configured to operate the control plane as described herein. The node 400 can include an interface 470 for communicatively coupling the common equipment 410, the line modules 420, and the switch modules 430 therebetween. For example, the interface 470 can be a backplane, mid-plane, a bus, optical or electrical connectors, or the like. The line modules 420 are configured to provide ingress and egress to the switch modules 430 and to external connections on the links to/from the node 400. In an exemplary embodiment, the line modules 420 can form ingress and egress switches with the switch modules 430 as center stage switches for a three-stage switch, e.g. a three stage Clos switch. Other configurations and/or architectures are also contemplated. The line modules 420 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 420 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 420 can include wavelength division multiplexing interfaces, short reach interfaces, and the like, and can connect to other line modules 420 on remote network elements, end clients, edge routers, and the like, e.g. forming connections on the links in the network 100. From a logical perspective, the line modules 420 provide ingress and egress ports to the node 400, and each line module 420 can include one or more physical ports. The switch modules 430 are configured to switch channels, timeslots, tributary units, packets, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 430 can include Time Division Multiplexed (TDM) (i.e., circuit switching) and/or packet switching engines. The switch modules 430 can include redundancy as well, such as 1:1, 1:N, etc. In an exemplary embodiment, the switch modules 430 provide OTN switching and/or Ethernet switching.

Those of ordinary skill in the art will recognize the node 400 can include other components which are omitted for illustration purposes, and that the systems and methods described herein are contemplated for use with a plurality of different network elements with the node 400 presented as an exemplary type of network element. For example, in another exemplary embodiment, the node 400 may not include the switch modules 430, but rather have the corresponding functionality in the line modules 420 (or some equivalent) in a distributed fashion. For the node 400, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 400 is merely presented as one exemplary node 400 for the systems and methods described herein.

Exemplary Controller

Figure 14:
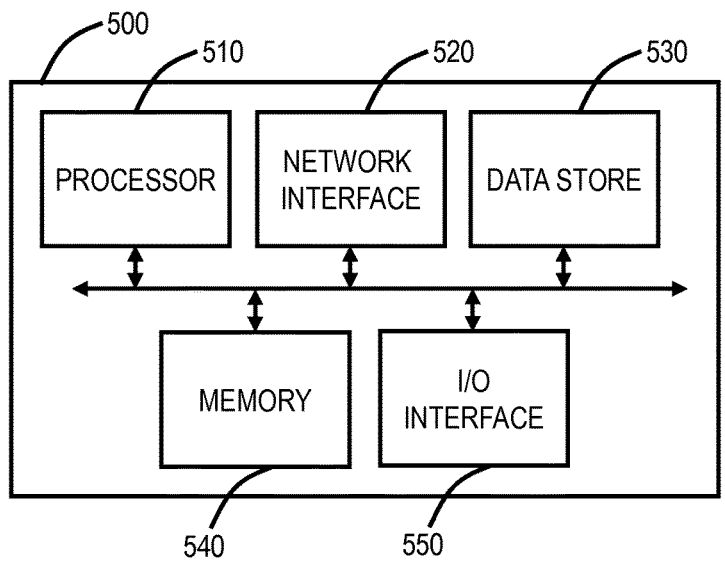
FIG. 14 is a block diagram of a controller to provide control plane processing and/or operations, administration, maintenance, and provisioning (OAM&P) for the node of FIG. 13.

Referring to FIG. 14, in an exemplary embodiment, a block diagram illustrates a controller 500 to provide control plane processing and/or operations, administration, maintenance, and provisioning (OAM&P) for the node 400. The controller 500 can be part of common equipment, such as common equipment 410 in the node 400, or a stand-alone device communicatively coupled to the node 400 via the DCN 460. The controller 500 can include a processor 510 which is hardware device for executing software instructions such as operating the control plane. The processor 510 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 510 is configured to execute software stored within memory, to communicate data to and from the memory, and to generally control operations of the controller 500 pursuant to the software instructions. The controller 500 can also include a network interface 520, a data store 530, memory 540, an I/O interface 550, and the like, all of which are communicatively coupled therebetween and with the processor 510.

The network interface 520 can be used to enable the controller 500 to communicate on the DCN 460, such as to communicate control plane information to other controllers, to the management system 450, and the like. The network interface 520 can include, for example, an Ethernet card (e.g., 10 BaseT, Fast Ethernet, Gigabit Ethernet) or a wireless local area network (WLAN) card (e.g., 802.11). The network interface 520 can include address, control, and/or data connections to enable appropriate communications on the network. The data store 530 can be used to store data, such as control plane information, provisioning data, OAM&P data, etc. The data store 530 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 530 can incorporate electronic, magnetic, optical, and/or other types of storage media. The memory 540 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 540 may incorporate electronic, magnetic, optical, and/or other types of storage media. Note that the memory 540 can have a distributed architecture, where various components are situated remotely from one another, but may be accessed by the processor 510. The I/O interface 550 includes components for the controller 500 to communicate to other devices. Further, the I/O interface 550 includes components for the controller 500 to communicate with the other nodes, such as using overhead associated with OTN signals.

In an exemplary embodiment, the controller 500 is configured to communicate with other controllers 500 in the network 100 to operate the control plane for control plane signaling. This communication may be either in-band or out-of-band. For SONET networks and similarly for SDH networks, the controllers 500 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 500 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCCO are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 500 is configured to operate the control plane 140 in the network 100. That is, the controller 500 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 500 can include a topology database that maintains the current topology of the network 100 based on control plane signaling (e.g., HELLO messages) and a connection database that maintains available bandwidth on the links 120 again based on the control plane signaling. Again, the control plane is a distributed control plane; thus a plurality of the controllers 500 can act together to operate the control plane using the control plane signaling to maintain database synchronization. In source-based routing, the controller 500 at a source node for a connection is responsible for path computation and establishing by signaling other controllers 500 in the network 100. For example, the source node and its controller 500 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes from the originating node to the destination node based on a plurality of constraints such as administrative weights on the links, bandwidth availability on the links, etc.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, in a node operating in a network with a control plane, to optimize wavelength retuning on service redials comprising one or more of modifying a path and a wavelength through the control plane, the method comprising:
 detecting a failure on a link associated with the node; and
 for each affected connection on the link, sending a respective release message to an associated originating node via the control plane, the release message including an associated protect path and a wavelength determined by the node instead of by the associated originating node, wherein the release message is utilized by the associated originating node to redial the affected connections with the associated protect path and the wavelength determined by the node, wherein the control plane is a source-based routing control plane with associated originating nodes using the protect path and the wavelength in the release message to redial the affected connections.

2. The method of claim 1, further comprising, to determine the associated protect path for each of the affected connections:
   adding each of the affected connections associated with the node to a queue with source-destination pairs;
   determining in order, the associated protect path using an existing wavelength for all connections in the queue if possible and if unable to find the associated protect path for a connection with the existing wavelength, moving the connection to an end of the queue; and
   if unable to find the associated protect path using the existing wavelength for one or more of the connections after traversing the queue, determining the associated protect path for the one or more of the connections which require a retune with a new wavelength.

3. The method of claim 2, wherein the associated protect path for all the connections in the queue with the existing wavelength is cached for additional iterations with the one or more of the connections requiring the retune.

4. The method of claim 1, wherein, to optimize the wavelength retuning, the node is configured to determine the associated protect path using an existing wavelength for all affected connections if possible first, and only for the affected connections that do not have a protect path with the existing wavelength, the node is configured to determine the protect path with different wavelength.

5. The method of claim 4, wherein the different wavelength is determined based on the wavelength retuning to any other wavelength in one order only in an incremental fashion.

6. The method of claim 4, wherein the different wavelength is determined based on the wavelength retuning in a few orders determined by a tree.

7. The method of claim 1, wherein the node has a Colorless/Directionless architecture at Layer 0.

8. A method, in a node operating in a network with a control plane, to plan protect paths to optimize wavelength retuning on service redials service redials comprising one or more of modifying a path and a wavelength through the control plane, the method comprising:
   adding each new connection associated with the node to a queue with source-destination pairs for the new connection;
   determining an associated protect path for all connections in the queue in order using an existing wavelength for each of the connections if possible and, if unable to find a protect path, moving the connection to an end of the queue;
   if unable to find the associated protect path for one or more of the connections with an associated existing wavelength after traversing the queue, determining the associated protect path for the one or more of the connections which require a retune with a new wavelength; and
   storing the associated protect paths for the connections, for use in respective release messages for affected connections responsive to a failure, the release messages including the associated protect path and a wavelength determined by the node instead of by an associated originating node for the connections.

9. The method of claim 8, wherein the associated protect path for all the connections in the queue with the existing wavelength is cached for additional iterations with the one or more of the connections requiring the retune.

10. The method of claim 8, wherein the new wavelength is determined based on the wavelength retuning to any other wavelength in one order only in an incremental fashion.

11. The method of claim 8, wherein the determining is performed as a background task in the node.

12. The method of claim 8, wherein the new wavelength is determined based on the wavelength retuning in a few orders determined by a tree.

13. The method of claim 8, further comprising:
   detecting the failure; and
   sending a respective release message for all the affected connections, via the control plane, with the associated protect path and wavelength to an associated originating node for each of the connections.

14. The method of claim 8, wherein, to optimize the wavelength retuning, the node is configured to determine the associated protect path using an existing wavelength for all the connections first if possible, and only for the connections that do not have a protect path with the existing wavelength, the node is configured to determine the associated protect path with a different wavelength.

15. The method of claim 8, wherein the node has a Colorless/Directionless architecture at Layer 0.

16. The method of claim 8, wherein the control plane is a source-based routing control plane with associated originating nodes using the associated protect path and the wavelength in the release message to redial the connections.

17. A node operating in a network with a control plane, the node is configured to plan protect paths to optimize wavelength retuning on service redials service redials comprising one or more of modifying a path and a wavelength through the control plane, the node comprising:
   one or more ports communicatively coupled to one or more links in the network; and
   a controller communicatively coupled to the one or more ports, wherein the controller is configured to
   detect a failure on a link associated with the node; and
   for each affected connection on the link, send a respective release message to an associated originating node via the control plane, the release message including a protect path and a wavelength, wherein the release message is utilized by the associated originating node to redial the affected connections with the protect path and the wavelength determined by the node,
   wherein, to optimize the wavelength retuning, the controller is configured to determine the associated protect path using an existing wavelength for all the affected connections first if possible, and only for the affected connections that do not have the associated protect path with the existing wavelength, the controller is configured to determine the associated protect path with a different wavelength.

18. The node of claim 17, wherein, to determine an associated protect path for each of the affected connection, the controller is further configured to:
   add each of the affected connections associated with the node to a queue with source-destination pairs for the new connection;
   determine in order, the associated protect path using an existing wavelength for all connections in the queue if possible and if unable to find the associated protect path for a connection with the existing wavelength, moving the connection to an end of the queue; and if unable to find the associated protect path using the existing wavelength for one or more of the connections after traversing the queue, determine the associated protect path for the one or more of the connections which require a retune with a new wavelength.

* * * * *